Patented July 21, 1953

2,646,427

UNITED STATES PATENT OFFICE 2,646,427

STREPTOMYCIN 2-HYDROXY-4-AMINO BENZOATE

Ray A. Patelski, Manhasset, N. Y., and Peter P. Regna, West New York, N. J., assignors to Chas. Pfizer & Co., Inc., a corporation of Delaware No Drawing. Application May 14, 1949, Serial No. 93,424

2 Claims. (Cl. 260—210)

This invention relates to certain novel therapeutically useful salts of streptomycin. More particularly, this invention relates to 2-hydroxy-4-aminobenzoic acid salts of streptomycin.

It is known that streptomycin is obtained from elaboration products formed during the growth of the microorganism Actinomyces griseus in a suitable culture medium by adsorption on activated carbon followed by an elution with an acidic solvent. (Proc. Soc. of Expt'l. Biol. and Med. 49, 207–212, (1942).) The product so obtained is a streptomycin salt, such as streptomycin trihydrochloride of relatively low potency or antibiotic activity. It can be further purified by several known procedures, such as chromatography or selective adsorption and elution. In other methods of purification, the streptomycin is precipitated as the reineckate, reineckate sulfate or the helianthate and then converted to the mineral acid salt.

It is further known that streptomycin is an effective agent in the treatment of tuberculosis. However, it has also been found that the causative organisms of tuberculosis in some instances become resistant to streptomycin therapy. This has led to a search for a more effective antibiotic, but so far as is known none has been discovered, although somewhat improved results have been obtained by the addition of certain compounds to penicillin salts.

An object of this invention is to provide new antibiotic salts of improved effectiveness in the treatment of tuberculosis. A further object is to prepare a novel therapeutically active salt of streptomycin. Further objects will appear hereinafter.

It has now been found that the 2-hydroxy-4-aminobenzoic acid salts of streptomycin possess therapeutic properties superior, particularly for tuberculosis therapy, to any heretofore known salts of streptomycin. The 2-hydroxy-4-aminobenzoic acid is also commonly known as p-aminosalicylic acid.

In one method for preparing the 2-hydroxy-4-aminobenzoic acid salt of streptomycin according to the present invention, a streptomycin salt, such as streptomycin sulfate in aqueous solution, is reacted with a water-soluble or partially water-soluble salt of 2-hydroxy-4-aminobenzoic acid, for example the barium salt in aqueous solution. This reaction may be indicated by the following equation:

$(C_{21}H_{39}N_7O_{12})_2 \cdot (H_2SO_4)_3 + 3(C_7H_7NO_3)_2Ba \rightarrow$
$3BaSO_4 + 2(C_{21}H_{39}N_7O_{12}) \cdot (C_7H_7NO_3)_3$ Because of the relatively poor water solubility of the barium salt of 2-hydroxy-4-aminobenzoic acid, it is preferred to prepare the desired streptomycin salt by dissolving the streptomycin sulfate in water, adding to the solution the calculated quantity of 2-hydroxy-4-aminobenzoic acid, and then precipitating the sulfate by the addition of an aqueous solution of barium hydroxide. The barium sulfate formed is filtered, and the 2-hydroxy-4-aminobenzoic acid salt of streptomycin is recovered from the filtrate.

The invention is further illustrated by the following example:

Example

Five grams of streptomycin sulfate are dissolved in 50 ml. of water. To this solution are added 3.1 grams of 2-hydroxy-4-aminobenzoic acid. With good agitation, about 18 ml. of water containing 1.77 grams of anhydrous barium hydroxide are slowly added. The precipitated barium sulfate is removed by filtration, the pH is adjusted to 5.5 and the solution is vacuum freeze-dried. The white streptomycin 2-hydroxy-4-aminobenzoate is found to assay about 530γ/mg. The theoretical potency of this compound is found to be 560γ/mg. against a streptomycin free base assigned 1000γ/mg.

The 2-hydroxy-4-aminobenzoic acid salts of streptomycin are white crystalline compounds soluble in water. They are extremely useful antibiotics and have shown an unusual degree of effectiveness against the tubercle bacilli. This invention combines for the first time in a single compound properties which, so far as is known, have never before been possessed by any antibiotic.

As many apparently widely different embodiments of this invention may be made without departing from the spirit and scope hereof, it is to be understood that this invention is not limited to the specific embodiments hereof, except as defined in the appended claims.

We claim:
1. 2-hydroxy-4-aminobenzoic acid salts of streptomycin.
2. Streptomycin tri-(p-aminosalicylate).

RAY A. PATELSKI.
PETER P. REGNA.

References Cited in the file of this patent

Ratcliff, Reader's Digest, November 1945, p. 39, 1 page.
Vander Brook et al., J. Biol. Chem., v. 165 (1946), p. 466.
Youmans et al., J. Bact., v. 54 (1947), pp. 415–416, 2 pages.